United States Patent
Park et al.

(10) Patent No.: US 7,787,868 B2
(45) Date of Patent: Aug. 31, 2010

(54) TERMINAL APPARATUS AND METHOD FOR PROVIDING MEDIA TRANSMISSION TIME INFORMATION IN A POC SYSTEM AND POC SYSTEM FOR THE SAME

(75) Inventors: Sung-Jin Park, Suwon-si (KR); Wuk Kim, Gwacheon-si (KR); Sang-Kyung Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 776 days.

(21) Appl. No.: 11/653,611

(22) Filed: Jan. 16, 2007

(65) Prior Publication Data

US 2007/0202854 A1  Aug. 30, 2007

(30) Foreign Application Priority Data

| Jan. 13, 2006 | (KR) | 10-2006-0004152 |
| Feb. 7, 2006 | (KR) | 10-2006-0011664 |
| May 12, 2006 | (KR) | 10-2006-0043144 |

(51) Int. Cl.
    *H04Q 7/38* (2006.01)
(52) U.S. Cl. .................. 455/414.1; 455/79; 370/252
(58) Field of Classification Search .................. 455/518
    See application file for complete search history.

(56) References Cited

U.S. PATENT DOCUMENTS

| 3,705,948 | A | * | 12/1972 | Tomisawa | 84/687 |
| RE29,273 | E | * | 6/1977 | Reiffin | 381/121 |
| 4,028,536 | A | * | 6/1977 | Woodward | 714/820 |
| 4,309,764 | A | * | 1/1982 | Acampora | 370/318 |
| 4,754,458 | A | * | 6/1988 | Dornstetter | 714/762 |
| 5,847,663 | A | * | 12/1998 | Chasek | 340/905 |
| 6,054,831 | A | * | 4/2000 | Moore et al. | 318/581 |
| 6,188,772 | B1 | * | 2/2001 | Norris et al. | 381/191 |
| 6,397,087 | B1 | * | 5/2002 | Kim et al. | 455/569.1 |
| 6,490,268 | B1 | * | 12/2002 | Lee et al. | 370/342 |
| 6,725,053 | B2 | * | 4/2004 | Rosen et al. | 455/518 |
| 6,738,617 | B2 | * | 5/2004 | Rosen et al. | 455/418 |
| 6,781,963 | B2 | * | 8/2004 | Crockett et al. | 370/260 |
| 6,791,995 | B1 | * | 9/2004 | Azenkot et al. | 370/436 |
| 6,825,810 | B2 | * | 11/2004 | Ragner et al. | 343/700 MS |
| 6,873,854 | B2 | * | 3/2005 | Crockett et al. | 455/518 |
| 6,898,436 | B2 | * | 5/2005 | Crockett et al. | 455/518 |
| 6,904,288 | B2 | * | 6/2005 | Rosen et al. | 455/518 |
| 6,912,401 | B2 | * | 6/2005 | Rosen et al. | 455/518 |
| 6,922,572 | B2 | * | 7/2005 | Lim | 455/570 |

(Continued)

FOREIGN PATENT DOCUMENTS

WO   WO 2004/100419   11/2004

*Primary Examiner*—Duc Nguyen
*Assistant Examiner*—Hai V Nguyen
(74) *Attorney, Agent, or Firm*—The Farrell Law Firm, LLP (57) ABSTRACT

Disclosed is a terminal apparatus and a method for providing media transmission time information in a Push-to-talk over Cellular (PoC) system. The method includes receiving a media burst granted message in response to a media burst request message, and confirming media transmission time information in the received media burst granted message, and informing a user of the confirmed media transmission time information. By the method, it is possible to recognize media transmission time information included in a floor granted message transmitted from a PoC server and informing a user of the media transmission time information.

9 Claims, 7 Drawing Sheets

U.S. PATENT DOCUMENTS

| | | | |
|---|---|---|---|
| 6,928,176 B2* | 8/2005 | Lin et al. | 381/123 |
| 7,023,983 B2* | 4/2006 | King | 379/388.01 |
| 7,047,031 B2* | 5/2006 | Rosen et al. | 455/518 |
| 7,053,917 B2* | 5/2006 | Kato et al. | 345/672 |
| 7,079,036 B2* | 7/2006 | Cooper et al. | 340/573.1 |
| 7,120,123 B1* | 10/2006 | Quigley et al. | 370/252 |
| 7,155,203 B2* | 12/2006 | Brewer et al. | 455/405 |
| 7,183,857 B2* | 2/2007 | Doy et al. | 330/297 |
| RE39,673 E * | 6/2007 | Lee et al. | 370/342 |
| 7,336,965 B2* | 2/2008 | Rajkotia | 455/458 |
| 7,386,000 B2* | 6/2008 | Lopponen et al. | 370/433 |
| 7,437,155 B2* | 10/2008 | Levitan | 455/433 |
| 7,499,441 B2* | 3/2009 | Wiatrowski et al. | 370/347 |
| 7,526,306 B2* | 4/2009 | Brems et al. | 455/518 |
| 7,561,528 B2* | 7/2009 | Huh et al. | 370/252 |
| 7,561,892 B2* | 7/2009 | Huh et al. | 455/518 |
| 2002/0150091 A1 | 10/2002 | Lopponen et al. | 370/389 |
| 2003/0152040 A1* | 8/2003 | Crockett et al. | 370/260 |
| 2003/0153339 A1* | 8/2003 | Crockett et al. | 455/518 |
| 2003/0153340 A1* | 8/2003 | Crockett et al. | 455/518 |
| 2003/0153341 A1* | 8/2003 | Crockett et al. | 455/519 |
| 2003/0153342 A1* | 8/2003 | Crockett et al. | 455/519 |
| 2003/0153343 A1* | 8/2003 | Crockett et al. | 455/519 |
| 2003/0154243 A1* | 8/2003 | Crockett et al. | 709/203 |
| 2003/0154249 A1* | 8/2003 | Crockett et al. | 709/204 |
| 2003/0179892 A1* | 9/2003 | Madsen | 381/120 |
| 2004/0100419 A1 | 5/2004 | Kato et al. | |
| 2005/0046575 A1* | 3/2005 | Cooper et al. | 340/573.1 |
| 2005/0084081 A1* | 4/2005 | Manto | 379/114.05 |
| 2005/0125315 A1* | 6/2005 | Munoz et al. | 705/30 |
| 2005/0143135 A1 | 6/2005 | Brems et al. | |
| 2005/0147229 A1* | 7/2005 | King | 379/388.01 |
| 2005/0184807 A1* | 8/2005 | Doy et al. | 330/297 |
| 2006/0013188 A1* | 1/2006 | Wiatrowski et al. | 370/347 |
| 2006/0019613 A1* | 1/2006 | Lim | 455/79 |
| 2006/0019692 A1* | 1/2006 | Huh et al. | 455/518 |
| 2006/0034336 A1* | 2/2006 | Huh et al. | 370/498 |
| 2006/0087971 A1* | 4/2006 | Kim et al. | 370/232 |
| 2006/0092895 A1* | 5/2006 | Kim et al. | 370/338 |
| 2006/0229108 A1* | 10/2006 | Cehelnik | 455/569.1 |
| 2007/0100981 A1* | 5/2007 | Adamczyk et al. | 709/223 |
| 2007/0133767 A1* | 6/2007 | Hahn et al. | 379/114.2 |
| 2007/0229169 A1* | 10/2007 | Doy et al. | 330/297 |
| 2007/0248040 A1* | 10/2007 | Huh | 370/328 |
| 2007/0254642 A1* | 11/2007 | Suotula | 455/422.1 |
| 2007/0280256 A1* | 12/2007 | Forslow | 370/395.2 |
| 2008/0020718 A1* | 1/2008 | Jin et al. | 455/90.2 |
| 2008/0089499 A1* | 4/2008 | Hahn et al. | 379/114.2 |
| 2008/0126230 A1* | 5/2008 | Bellora et al. | 705/32 |
| 2008/0235322 A1* | 9/2008 | Holm et al. | 709/201 |
| 2008/0248826 A1* | 10/2008 | Holm | 455/518 |
| 2008/0273120 A1* | 11/2008 | Doy et al. | 348/707 |
| 2008/0285532 A1* | 11/2008 | Gentric | 370/340 |
| 2008/0298308 A1* | 12/2008 | Hannu et al. | 370/328 |
| 2008/0311883 A1* | 12/2008 | Bellora et al. | 455/406 |
| 2009/0124246 A1* | 5/2009 | Huh et al. | 455/418 |
| 2009/0141742 A1* | 6/2009 | Huh et al. | 370/498 |
| 2009/0298487 A1* | 12/2009 | Przybysz et al. | 455/416 |

* cited by examiner

TERMINAL APPARATUS AND METHOD FOR PROVIDING MEDIA TRANSMISSION TIME INFORMATION IN A POC SYSTEM AND POC SYSTEM FOR THE SAME

PRIORITY

This application claims priority under 35 U.S.C. §119(a) to an application entitled "Terminal Apparatus And Method For Providing Media Transmission Time Information In A PoC System And PoC System For The Same"$_a$ filed in the Korean Industrial Property Office on Jan. 13, 2006 and assigned Serial No. 2006-4152, and filed May 12, 2006 and assigned Serial No. 2006-43144, respectively, the contents of both of which are incorporated herein by reference.

BACKGROUND OF THE INVENTION

1. Field of the Invention

The present invention relates generally to a Push-to-talk over Cellular (PoC) terminal, and more particularly to a method for informing a PoC user of remaining time information available for media transmission when a communication has been established according to a request for the communication.

2. Description of the Related Art

With the rapid development of mobile communications and the vast expansion of communication networks, cellular phones are now being used to provide a wider variety of extended services and applications. Cellular phone users are requiring a wider variety of services beyond the basic talk communication service, such as location, multimedia and Push-To-Talk (PTT) services. The current PTT service supports various additional functions, such as instant messenger and status display functions, as well as group and voice communication, which may also be provided by an existing radio transmitter or a Trunk Radio System (TRS).

Active research currently being conducted about establishment of a standard for a PoC service to be provided through a mobile communication network using the PTT concept. The PoC service is distinguished from the existing mobile communication services, in that a user belongs to multiple sessions and thus can continue communication while moving between sessions if necessary. The requirement that a user be capable of continuing communication while moving between sessions is clearly found in a requirement of the Open Mobile Alliance (OMA), which is a forum for specifying mobile communications services.

Figure 1:
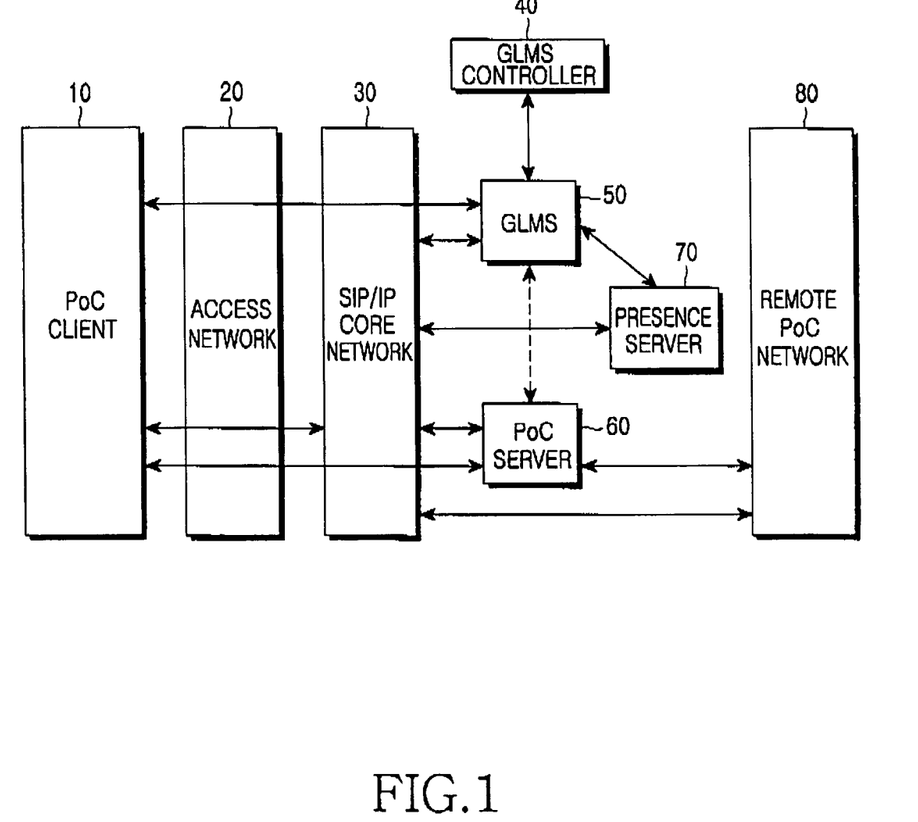
FIG. 1 illustrates a basic structure of a conventional PoC system.

FIG. 1 illustrates a basic structure of a conventional PoC system. Referring to FIG. 1, the PoC client 10 corresponds to a service requester embedded in a mobile terminal, which is usually connected through an access network 20 to an Session Initiation Protocol (SIP) and Internet Protocol (IP) core network 30, which is for supporting SIP/IP multimedia.

The PoC client 10 resides in a PoC client terminal in order to enable access to a PoC service. A main functions of the PoC client 10 are to generate a PoC session at the PoC client side, and participate in and terminate the session. Moreover, the PoC client 10 functions to make and transfer a talk burst, support an instant personal alert and perform authentication when accessing the PoC service. Hereinafter, unless otherwise stated, the PoC client 10 is assumed to be the same as a PoC service subscriber.

The SIP/IP core network 30 is connected to a PoC server 60, a Group List and Management System (GLMS) 50 and a presence server 70, in order to support a PoC service.

The GLMS 50 is a server that stores information of PoC service subscribers and transfers subscribers (e.g., subscriber ID, terminal number and group information) in cooperation with the PoC server 60.

The presence server 70 stores status information, such as location and status (i.e., on-line or off-line) of a PoC service subscriber, which registers/maintains a current position of an on-line user and informs users of such registered/maintained information, thereby enabling instant communication between users.

The PoC server 60 serves as a Controlling PoC Function (CF) for maintaining and managing a PoC session, or a Participating PoC Function (PF) for participating in a PoC session for a one-to-one PoC call or a one-to-many PoC call (or group PoC call).

The PoC server is classified into a Controlling PoC Function (CF) of overseeing maintenance and management of a PoC session and a Participating PoC Function (PF) of overseeing maintenance and management between each PoC session, which will be explained with reference to the Tables 1 and 2 below.

TABLE 1

| Controlling PoC Function(CF) |
| --- |
| Provides centralized PoC session handling |
| Provides the centralized Media distribution |
| Provides the centralized Talk Burst Arbitration functionality including talker identification |
| Provides SIP session handling, such as SIP session origination, termination, etc. |
| Provides policy enforcement for participation in group sessions |
| Provides the participants information Collects and provides centralized media quality information |
| Provides centralized charging reports |
| May provide transcoding between different codecs; Support Talk Burst Control Protocol Negotiation |

As shown in Table 1, the CF maintains and manages an entire PoC session. The PoC server receives requests for a floor from PoC clients, arranges an order in which to give the clients the floor, and gives the clients the floor in that order. The PoC server also distributes a talk burst, for which an arbitrary PoC client makes a request, to all other PoC clients participating in a group PoC call, and provides information of the PoC clients participating in the group PoC call.

As shown in Table 2 below, the PF manages a PoC session between the CF and each PoC client. In particular, the PF relays the floor between the PoC client and the CF when the PoC client makes a request for the floor or when the CF gives the floor to the PoC client. In addition, the PF relays media between the CF and the PoC client, performs transcoding between different codecs, and filters one of two concurrent PoC sessions according to the choice of a PoC user when there is simultaneous talking in the two concurrent PoC sessions.

TABLE 2

| Participating PoC Function(PF) |
| --- |
| Provides PoC session handling |
| May provide the Media relay function between PoC Client and Controlling PoC server |
| May provide user media adaptation procedures |
| May provide the Talk Burst control message relay function between PoC Client and Controlling PoC server Provides SIP session handling, such as SIP session origination, termination, etc, on behalf of the represented PoC Client. |
| Provides policy enforcement for incoming PoC session (e.g. access |

TABLE 2-continued

Participating PoC Function(PF)

control, incoming PoC session barring, availability status, etc)
May collect and provide media quality information; Provides the
participant charging reports
May provide filtering of the media streams in the case of simultaneous
sessions
May provide transcoding between different codecs
May support Talk Burst Control Protocol Negotiation; Stores the
current Answer
Mode and Incoming PoC Session Barring preferences of the PoC Client In the PoC service system as described above, the PoC user can input information on a group and its members to the GLMS 50 through his/her PoC terminal, and can learn information about PoC users whom he or she can call through an individual or group list transmitted from the GLMS 50. Alternatively, the information on the group and its members may be input, corrected and managed in the GLMS 50 via a reliable communication network such as the Internet or Intranet.

In order to make use of the PoC service, the PoC user registers his/her PoC address with the SIP/IP core network 30. The SIP/IP core network 30 stores PoC user information based on the request of the PoC user. Thus, when another PoC user tries to request a group PoC call, the PoC user registers his/her information in the SIP/IP core network 30 in advance as described above, and requests the group PoC call to his/her SIP/IP core network 30 by using group identification information transmitted from the GLMS 50. At this time, the SIP/IP core network 30 performs address and domain location determination by using information of the call requesting PoC user and then transfers a PoC call request to a home PoC server with which the call requesting PoC user is registered. In regard to the PoC call request, the PoC server prepares for establishment of a PoC session, obtains each user's information from the GLMS 50, and then transfers a PoC call request signal to a corresponding SIP/IP core network 30. Here, in the case of a PoC call request to users within an Intradomain, the PoC server performs both the CF and PF. The PoC server, which manages a call-requested PoC user, requests a PoC call to the PoC user after the SIP/IP core network 30 performs the location determination procedure, by using information of the PoC user that is transmitted to the PoC server.

Hereinafter, a general procedure where a PoC user obtains a floor in a conventional PoC system having the construction described above will be discussed with reference to FIG. 2.

Figure 2:
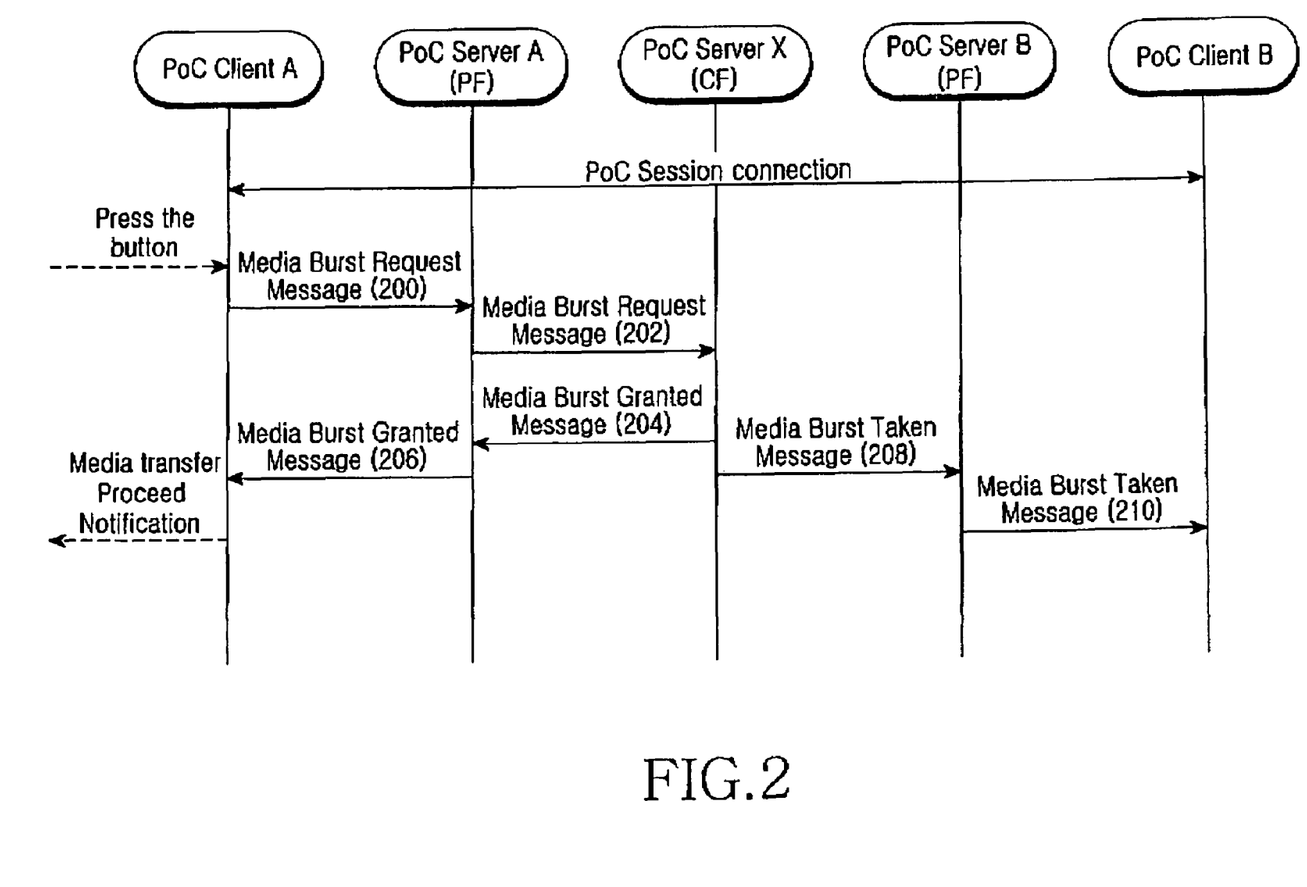
FIG. 2 illustrates a conventional procedure by which a PoC user obtains a floor.

Within a PoC session where a PoC client A is connected to a PoC client B, when there is an input from a user in order to obtain a floor, the PoC client A makes a request for the floor by transmitting a message making a request for media transmission, a Media Burst Request message, to a PoC server A in step 200. The PoC server A acts as the PF. After receiving Media Burst Request message, the PoC server A transmits the Media Burst Request message to a PoC server X in step 202. The PoC server X acts as the CF. After receiving the message requesting the floor, the PoC server X transmits a message granting the floor, a Media Burst granted message, to the PoC client A through steps 204 and 206. Further, the PoC server X transmits a message indicating that the PoC client A has been granted the floor, a Media Burst Taken message, to the PoC client B. At this time, the Media Burst Taken message includes an IDentifier (ID) of the PoC client A, that is, information by which the PoC client B having received the message can know the identity of the talker. In the PoC communication as described above, when the talker has been granted the right to transmit the media burst, the talker can transmit media only during a time interval set by a service provider. According to a standard arranged by the Open Mobile Alliance (OMA), a service provider can determine such a time interval. The reason why a client sets and operates an available time interval for media transmission as described above is to mediate between PoC participants in a PoC system, thereby preventing exclusive and continuous media transmission by one PoC session participant, which may disturb media transmission by another PoC session participant because the PoC service employs a half-duplex scheme.

Figure 6:
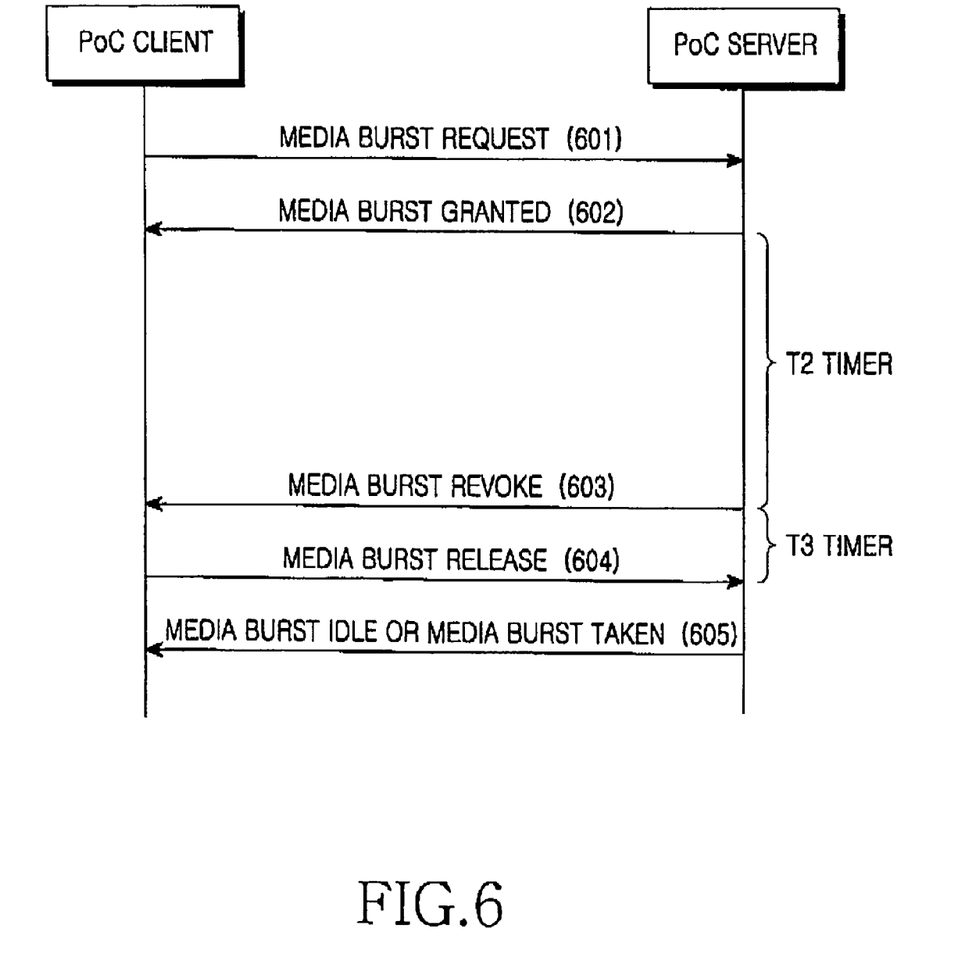
FIG. 6 is a signal flow diagram of signals between a PoC client and a PoC server when a PoC terminal apparatus transmits a media burst in a conventional PoC system.

Hereinafter, a signal flow between a PoC client and a PoC server when a PoC terminal apparatus transmits a media burst in a conventional PoC system will be discussed with reference to FIG. 6. Referring to FIG. 6, the PoC client makes a request for media transmission by transmitting a media burst request message for media transmission to a PoC server in step 601 as in steps 200 to 202 of FIG. 2.

Then, the PoC server having received the media burst request message transmits a media burst granted message to the PoC client who transmitted the media burst request message in step 602 as in steps 204 to 206 of FIG. 2. Thereafter, the PoC server operates a timer T2 related to the media transmission time. When the time set in the timer T2 has expired, the PoC server transmits a media burst revoke message to the PoC client in step 603. The transmitted media burst revoke message corresponds to a message reporting that the transmission time has expired and it is impossible to continue transmitting media. After receiving the media burst revoke message, the PoC client stops encoding of the PoC user's voice, generates a media burst release message and transmits the generated media burst release message to the PoC server.

Thereafter, the PoC server operates another timer T3 for allowing extra time for transmission of the media burst remaining in the PoC client buffer message and allows the PoC client to transmit the media burst stored in the buffer while the timer T3 is operated. Further, when the PoC client has transmitted a media burst release message in step 604, the PoC server transmits a media burst idle or media burst taken message (step 605) to all PoC clients participating in the PoC session, thereby reporting that the previous PoC client has completed the media transmission. The media burst includes voice in the OMA spec PoC v1 and includes media in the OMA spec PoC v2. In the following description, the media burst includes voice. Therefore, one of the media burst may be a talk burst.

In the process described above, the media burst granted message transmitted from the PoC server X (CF X) to the PoC client A includes a header having a media transmission time value, from which the PoC client A can recognize an allowed initial media transmission time value. However, although the PoC client is aware of the initial media transmission time value, when the PoC client has transmitted the media burst during a time interval, the PoC client cannot inform a PoC user of the remaining available time for media transmission because the PoC client does not have an interval function for measuring the transmission time. Therefore, the media transmission may be unexpectedly interrupted due to the expiration of the transmission time.

SUMMARY OF THE INVENTION

Accordingly, the present invention has been made to solve the above-mentioned problems occurring in the prior art, and an object of the present invention is to provide a terminal apparatus and method for recognizing media transmission time information included in a floor granted message transmitted from a PoC server and informing a user of the media transmission time information.

It is another object of the present invention to provide a terminal apparatus and method for recognizing media transmission time information included in a floor granted message transmitted from a PoC server and informing a user of a floor expiration time information before a floor time expires.

In order to accomplish these objects, there is provided a method for providing media transmission time information in a PoC system, the method including receiving a media burst granted message in response to a media burst request message, confirming media transmission time information in the received media burst granted message, and informing a user of the confirmed media transmission time information.

In accordance with the present invention, there is provided a PoC terminal apparatus for providing media transmission time information in a PoC system, the PoC terminal apparatus including a key input unit for outputting specific key input data according to input of each key, a display unit for displaying received media data and data output through the key input unit, and a control unit for receiving a media burst granted message in response to a media burst request message, confirming media transmission time information in the received media burst granted message, and informing a user of the confirmed media transmission time information.

In accordance with the present invention, there is provided a PoC system including a PoC server for transmitting a media burst granted message including a media transmission time value to a PoC client having transmitted a media burst request message to the PoC server, and transmitting a message for informing termination of media transmission of a previous PoC client to all PoC clients participating in a PoC session when the PoC server has received a media burst release message, and a PoC client for transmitting a media burst request message to the PoC server when there is an input for making a request for a media burst, confirming a media transmission time value included in the media burst granted message and transmitting media during the confirmed media transmission time when it has received the media burst granted message, and transmitting a media burst release message to the PoC server when the media transmission time value has expired.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness.

The present invention discloses a scheme for informing a PoC user of remaining time information available for a floor included in a Media burst granted message received from a PoC server by a PoC terminal apparatus equipped with a timer, so that the PoC user can confirm the remaining time during which he/she can speak. Further, the present invention discloses a scheme for informing a PoC user of time available for media transmission when a PoC terminal apparatus transmits media in a PoC communication service.

Hereinafter, an internal structure and operation of a PoC terminal apparatus for informing a PoC user of time information available for media transmission according to the present invention will be described with reference to FIG. 3.

The PoC terminal apparatus 300 interfaces with the user and includes a key input unit 304 for outputting specific key input data corresponding to each of the keys provided at the PoC terminal apparatus 300. Further, the PoC terminal apparatus 300 includes a data transceiver unit 305 for transmission/reception of packet data with the PoC server. Moreover, the PoC terminal apparatus 300 includes a display unit 303 for displaying media data received through the data transceiver unit 305 and data output through the key input unit 304, and a control unit 301 for controlling the data transmission/reception of the PoC terminal apparatus 300 and the display by the display unit 303. The control unit 301 controls reception of a media burst granted message in response to the media burst request message, confirmation of transmission time information within the received media burst granted message, and reporting of the confirmed transmission time information to the user. In informing a user of the confirmed media transmission time information, two embodiments of the present invention can be described as follows. According to the first embodiment, the control unit 301 operates a timer 306 such that confirmed media transmission time information is set as an initial value and the confirmed initial value is then down-counted. For example, the initial transmission time value may be set as 30 seconds and may be then down-counted per second in the manner of "29 seconds, 28 seconds, . . . " Otherwise, the initial value may be set as "0 seconds" and be then up-counted to a value as high as a transmission time informing value. Then, when there remains a time value as much as the transmission time informing value, this value may be reported to the user. For example, when the transmission time informing value has been set as five seconds and the transmission time value is confirmed to be 30 seconds, the initial timer value is set as "0" seconds and is then up-counted per second to 5 seconds in the manner of "0 seconds, 1 second, 2 seconds, . . . " When 25 seconds has elapsed, that is, there remains five seconds corresponding to the transmission time informing value, the user is informed that five seconds remains as time available for the media transmission. Further, the up-counted time value from the "0" seconds to the transmission time value may be continuously displayed on a screen regardless of transmission time informing value. This is another way to implement.

Thereafter, when the timer value of the timer 306 becomes equal to the media transmission time informing value, the media transmission time informing value for informing the remaining time available for the media transmission is displayed on a screen under the control of the control unit 301. According to the second embodiment, under the control of the control unit 301, confirmed media transmission time information is set as an initial value, a timer is then operated to down-count the confirmed initial value, and the timer value down-counted from the initial value is displayed on a screen. Further, the PoC terminal apparatus 300 includes a memory 307 for storing information in relation to general functions of the terminal, data related to provision of the PoC service, a user account for identification of a terminal, information set by a user or provided by a server, and a time value for reporting media transmission expiration time by the user. Further, the PoC terminal apparatus 300 includes the timer 306 controlled by the control unit 301. The timer 306 counts a remaining time value available for the media transmission by a driving control signal from the control unit 301.

Hereinafter, a process in which the PoC terminal apparatus 300 confirms the media transmission time information included in the Media Burst granted message received from the PoC server and informs a user of the Media transmission expiration time information before the media transmission expiration time set in advance, will be described with reference to FIGS. 3 and 4.

First, the PoC user stores a time value for informing expiration of the media transmission time in advance in the memory 307 through the key input unit 304. For example, if the media transmission time value included in the floor granted message received from the PoC server is 30 seconds and the media transmission expiration informing time value is five seconds, the PoC terminal apparatus 300 sets the timer value as 30 seconds from the time point at which the apparatus 300 has received the floor granted message and operates the timer to be down-counted, and informs the user, when there remains five seconds, that the floor will soon expire.

After the time value for informing the expiration of the media transmission is set as described above, the control unit 301 maintains PoC Session connection state in step 400 and, the control unit 301 determines in step 402 whether there is an input for making a request for media transmission. When there is no input in order to make a request for media transmission, the process returns to step 400. However, when there is an input for making a request for media transmission, the control unit 301 transmits, in step 404, a media burst request message through the PF to the PoC server that acts as the CF. Then, in step 406, the control unit 301 determines whether a media burst granted message is received from the PoC server, and proceeds to step 408 when the media burst granted message is received.

In step 408, the control unit 301 confirms the media transmission time value within the media burst granted message and operates the timer 306 by setting the media transmission time value as an initial value. Thereafter, in step 410, the control unit 301 determines whether the timer value is equal to the media transmission time informing value during the operation of the timer 306. For example, when the confirmed media transmission time value is 30 seconds and the transmission time informing value is five seconds, that is, when it has been set to alarm five seconds before the media transmission time expires, the control unit 301 counts the timer value from an initial value of 30 seconds at a time point of receiving a media burst granted message, and determines whether the timer value reaches five seconds.

Figure 4:
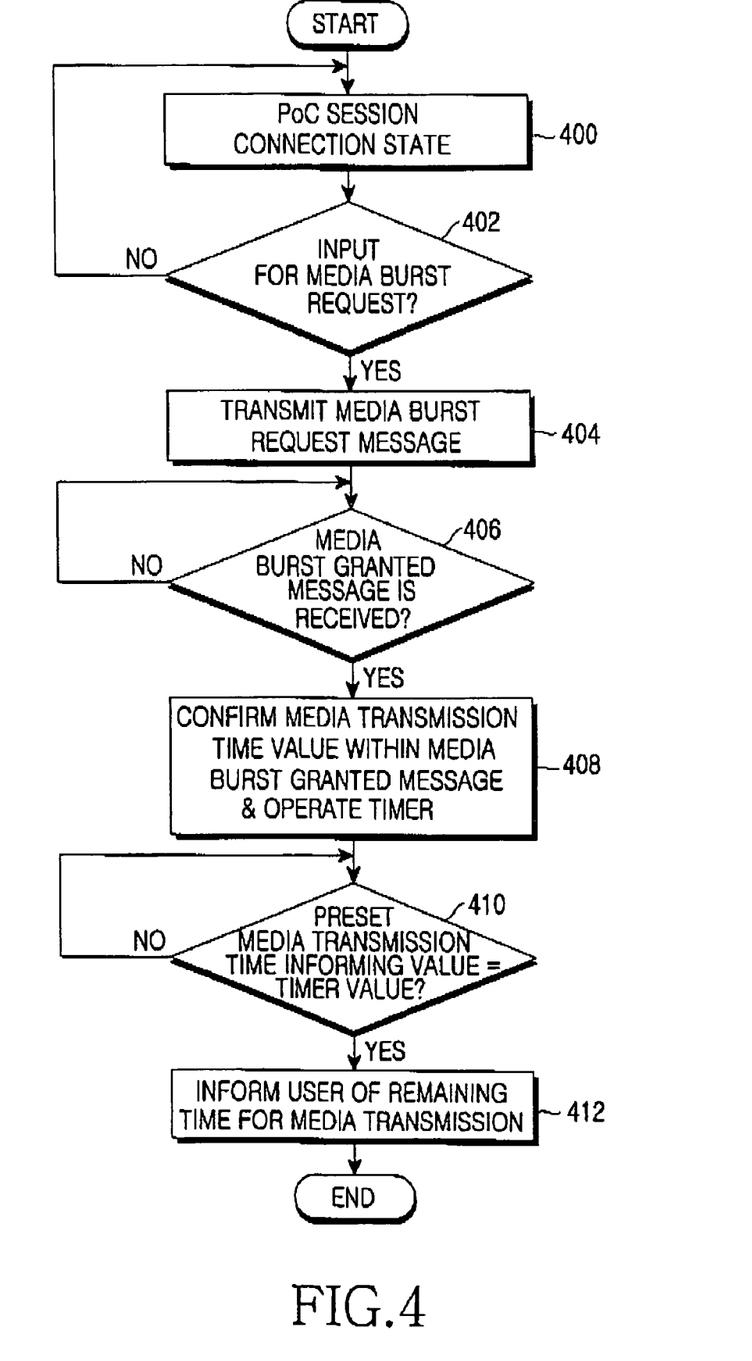
FIG. 4 illustrates a process in which a PoC terminal apparatus informs users of media transmission time information received from a PoC server according to the present invention.

As a result of the determination in step 410, when the timer value is equal to the media transmission time informing value, the control unit 301 informs the user of remaining time information available for the media transmission. That is, the control unit 301 outputs to the PoC user an alarm that the remaining media transmission time is as much as the time value set in advance. In order to report the remaining time information available for the media transmission to the user, various methods can be used, such as vibration, flashing light or screen display of remaining time. Further, for example, by displaying a warning message for the termination of the media transmission as shown in FIG. 5B, it is possible to report to the user that the time given to the user for the media transmission will soon expire.

As described above with reference to FIGS. 3 and 4, when a time value reaches a media transmission informing time value set in advance from an initial value, it is possible to inform a user of the remaining time for the media transmission.

Figure 5A:
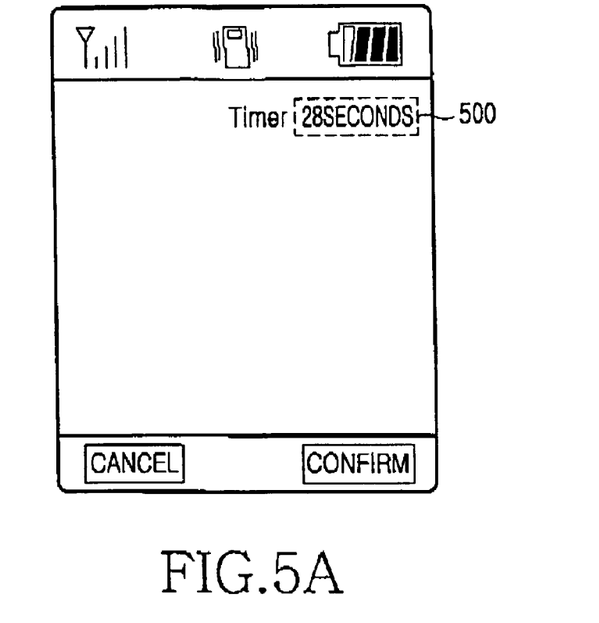
FIGS. 5A and 5B illustrate examples of screens for informing a user of media transmission time information received by a PoC terminal from a PoC server according to the present invention.
Figure 5B:
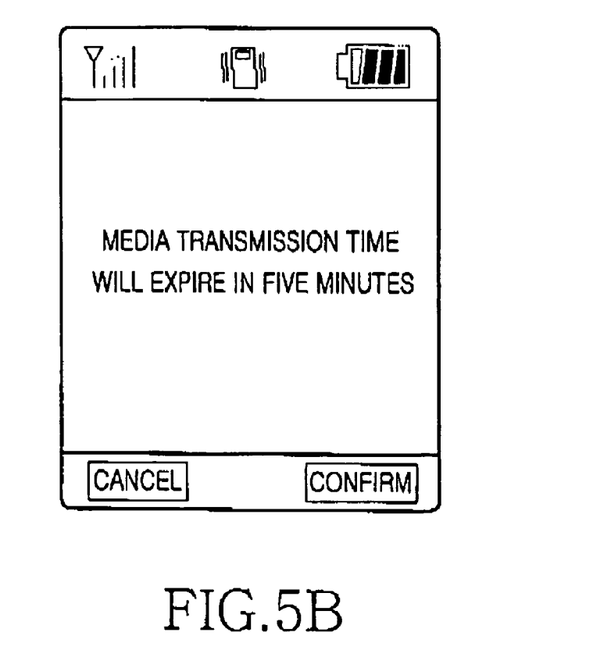

According to another embodiment of the present invention, the control unit 301 confirms the media transmission time value within the media burst granted message and operates the timer 306 with the media transmission time value as an initial value while displaying the down-counted media transmission time value as shown in FIG. 5A. From the screen on which the media transmission time value is down-counted, the PoC user always can confirm his/her available media transmission time.

Figure 3:
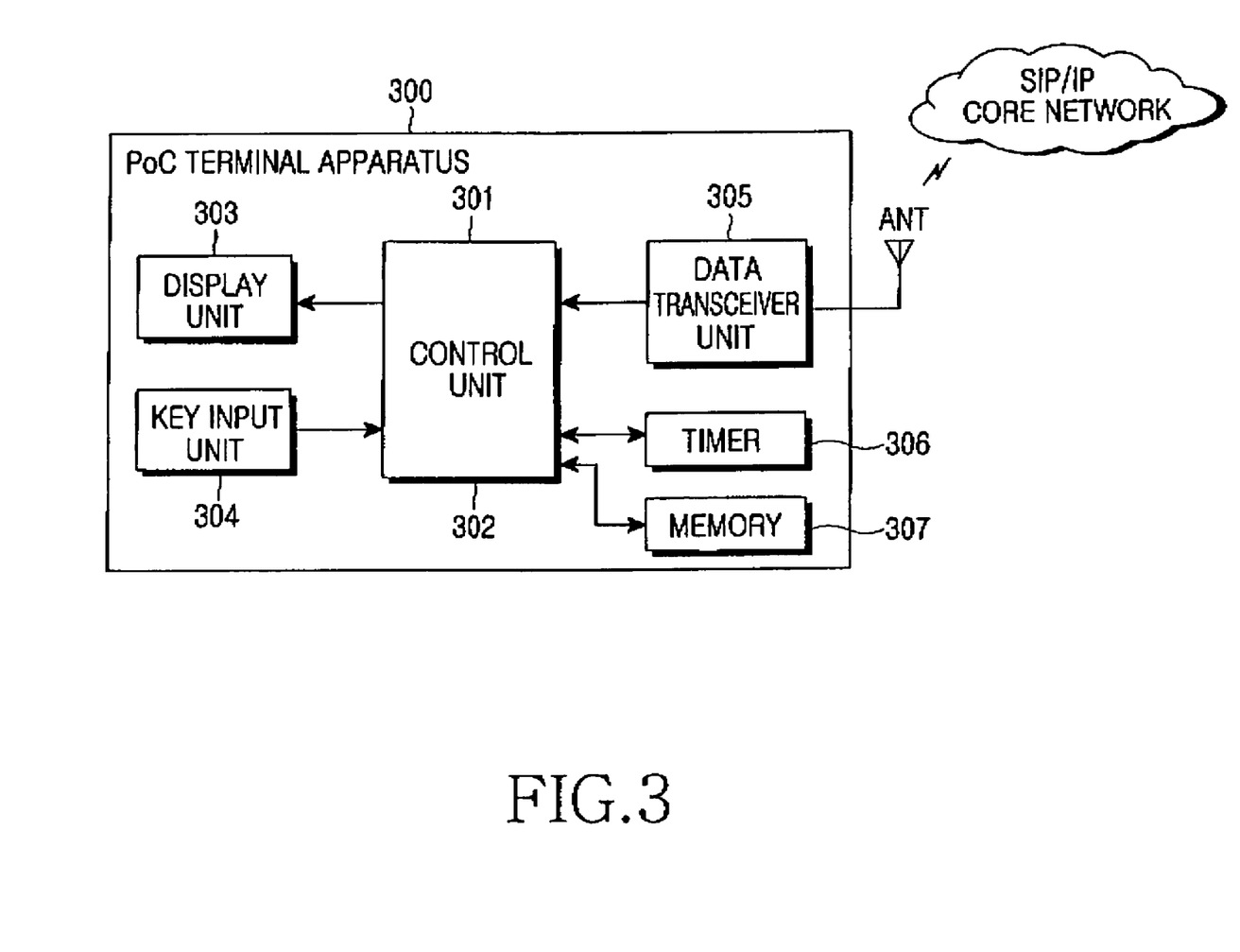
FIG. 3 illustrates an internal structure of a PoC terminal apparatus that provides media transmission time information received from the PoC server according to the present invention.

Hereinafter, a signal flow between a PoC client and a PoC server when a PoC client having the construction as shown in FIG. 3 transmits a media burst will be discussed with reference to FIG. 7. According to the present invention, a right to transmit media, i.e., the media burst, includes a right to transmit voice, that is, a floor or a talk burst.

Figure 7:
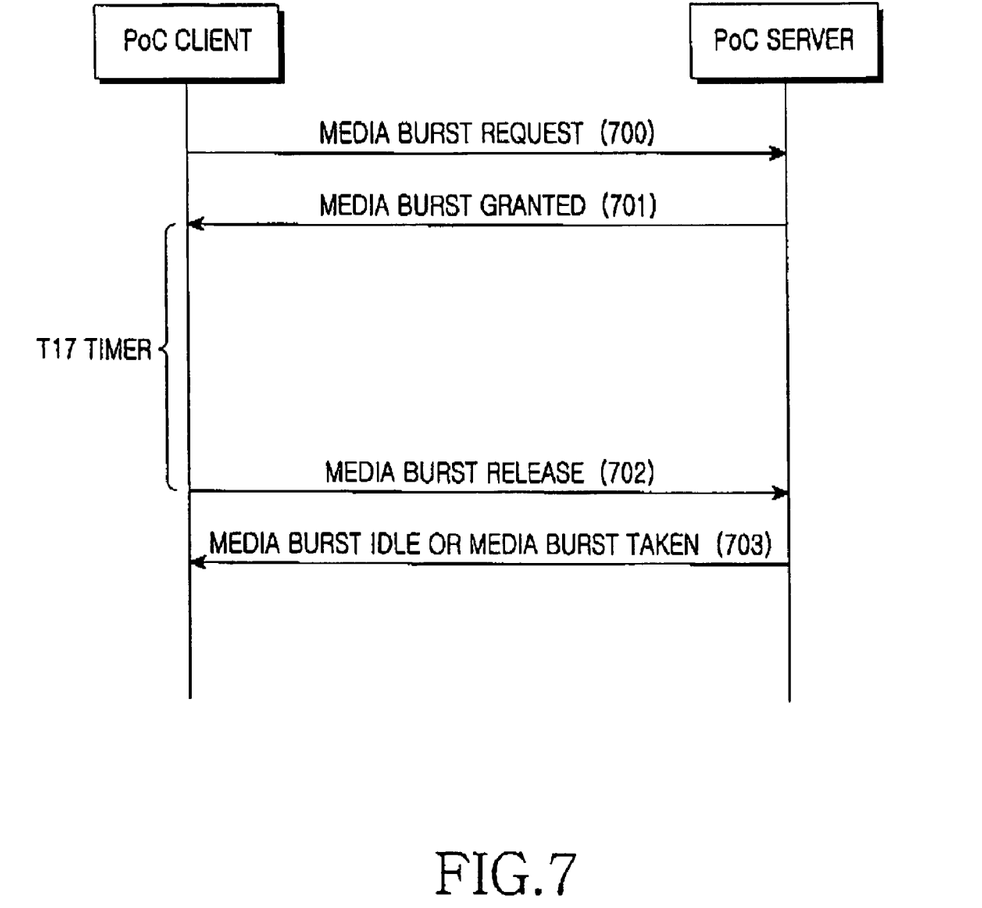
FIG. 7 is a signal flow diagram of signals between a PoC client and a PoC server when a PoC terminal apparatus transmits a media burst in a PoC system according to the present invention.

Referring to FIG. 7, the PoC client makes a request for media transmission by sending a media burst request message to a PoC server in step 700. Then, in step 701, the PoC server having received the media burst request message sends a media burst granted message to the PoC client having sent the media burst request message.

After receiving the media burst granted message, the PoC client confirms the media transmission time value in the media burst granted message and operates the timer 306 with the media transmission time value as an initial value. When the timer value becomes equal to a media transmission time informing value during operation of the timer 306, the PoC client informs the user of remaining time information available for the media transmission. Further, when the time for the media transmission set in the timer expires, the PoC client stops encoding of the PoC user's voice, generates a media burst release message and sends the generated media burst release message to the PoC server. In this manner, the PoC client informs termination of the media transmission by sending the media burst release message to the PoC server. After receiving the media burst release message, the PoC server sends a media burst idle or media burst taken message to all PoC clients participating in the PoC session, thereby reporting that the previous PoC client has completed the media transmission.

According to the present invention as described above, a PoC user can recognize remaining time available for media transmission and thus can control his/her media transmission. For example, a PoC user can recognize the remaining seconds while he/she speaks, and thus can easily close out the transmission before getting penalty, which prohibits to send Media Bursts during pre-determined time. Further, a user can schedule the media transmission according to the remaining time available for the media transmission. Moreover, according to the present invention, the PoC server sends a media burst granted message including a media transmission time value to the PoC client having sent a media burst request message, and the PoC client operates a media transmission timer with an initial media transmission time value and sends a media burst release message when the time set in the timer expires. Therefore, according to the present invention, it is unnecessary to operate the conventional timer for counting the media transmission time in the PoC Server (That is T2 timer as specified in OMA PoC UserPlane Document) and the extra conventional timer in PoC Server (which is T3 'grace timer' as specified in OMA PoC UserPlane Document) for providing extra time for transmission of the media stored in the buffer within the PoC client. Moreover, the PoC server does not have to deliberately transmit a media burst revoke message for informing that it is impossible to continue transmitting the media due to expiration of the media transmission time. Therefore, the present invention can increase the efficiency of air and network resources. Further, according to the present invention, instead of transmitting the media burst revoke message, the PoC server receives the media burst release message from the PoC client at that time. Therefore, it is possible to reduce the time for mediation of the media transmission by the PoC server as much as the time value for allowing extra time for transmission of the media stored in the buffer within the PoC client.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing media transmission time information in a Push-to-talk over Cellular (PoC) system, the method comprising the steps of:
   receiving a media burst granted message in response to a media burst request message;
   setting media transmission time information and remaining time information using the received media burst granted message;
   transmitting the media during the set media transmission time: and
   notifying a user of a remaining time according to the set remaining time information by:
   operating a timer such that remaining time available for the media transmission is counted by the timer; and
   displaying the remaining time in order to inform the user of the remaining time available for the media transmission.

2. The method as claimed in claim 1, wherein the timer is operated such that the set media transmission time information is set as an initial value and the initial value is down-counted, and the remaining time is displayed on a screen when a value of the timer becomes equal to the set remaining time information.

3. The method as claimed in claim 1, wherein
   the timer is operated a timer such that the set media transmission time information is set as an initial value and the initial value is down-counted, and a value of the timer is displayed from the initial value in order to inform the user of remaining time available for the media transmission.

4. A PoC terminal apparatus for providing media transmission time information in a PoC system, the PoC terminal apparatus comprising:
   a key input unit for outputting specific key input data according to input of each key;
   a display unit for displaying received media data and data output through the key input unit;
   a control unit for controlling to receive a media burst granted message in response to a media burst request message, to set media transmission time information and remaining time information using the received media burst granted message, to transmit the media during the set media transmission time, and to notify a user of a remaining time according to the set remaining time information;
   a memory for storing the media transmission time information and the remaining time information in order to inform the user of remaining time available for the media transmission; and
   a timer for counting the remaining time available for the media transmission according to a control signal of the control unit.

5. The PoC terminal apparatus as claimed in claim 4, wherein the control unit for controlling to operate the timer such that the set media transmission time information is set as an initial value and the initial value is down-counted, and displays the remaining time on a screen when a value of the timer becomes equal to the set remaining time information.

6. A Push-to-talk over Cellular (PoC) system comprising:
   a PoC server for transmitting a media burst granted message including a media transmission time information to a PoC client having transmitted a media burst request message to the PoC server, and transmitting a message for informing termination of media transmission of a previous PoC client to all PoC clients participating in a PoC session when the PoC server has received a media burst release message; and
   a PoC client for transmitting a media burst request message to the PoC server when there is an input for making a request for a media burst, setting media transmission time information and remaining time information using the media burst granted message transmitting media during the set media transmission time when it has received the media burst granted message, notifying a user of a remaining time according to the set remaining time information, and transmitting a media burst release message to the PoC server when the media transmission time value has expired.

7. The PoC system as claimed in claim 6, wherein the PoC server waits for reception of the media burst release message from the PoC client after transmitting the media burst granted message.

8. The PoC system as claimed in claim 6, wherein the PoC client operates a timer such that the set media transmission time information is set as an initial value and the initial value is down-counted, determines whether a value of the timer becomes equal to the remaining time information during operation of the timer, and displays the remaining time information on a screen when the value of the timer becomes equal to the set remaining time information.

9. The PoC system as claimed in claim 6, wherein the PoC client operates a timer such that the set media transmission time information is set as an initial value and the initial value is down-counted, and displays a value of the timer from the initial value in order to inform the user of remaining time available for the media transmission.

* * * * *